US009047485B2

(12) United States Patent
Mastie

(10) Patent No.: US 9,047,485 B2
(45) Date of Patent: Jun. 2, 2015

(54) INTEGRATED MASKING FOR VIEWING OF DATA

(75) Inventor: Scott David Mastie, Longmont, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1603 days.

(21) Appl. No.: 12/047,205

(22) Filed: Mar. 12, 2008

(65) Prior Publication Data

US 2009/0235199 A1 Sep. 17, 2009

(51) Int. Cl.
G06F 3/048 (2013.01)
G06F 21/62 (2013.01)
G06F 21/84 (2013.01)

(52) U.S. Cl.
CPC ............ *G06F 21/6245* (2013.01); *G06F 21/84* (2013.01)

(58) Field of Classification Search
CPC ........................... G06F 3/0481; G06F 3/04845
USPC ..................................... 715/781, 741; 705/51
See application file for complete search history.

(56) References Cited

U.S. PATENT DOCUMENTS

| 5,801,697 | A | | 9/1998 | Parikh et al. |
| 5,818,474 | A | * | 10/1998 | Takahashi et al. ............... 347/15 |
| 6,480,850 | B1 | * | 11/2002 | Veldhuisen .................... 707/610 |
| 6,959,389 | B1 | | 10/2005 | Dunn et al. |
| 6,980,177 | B2 | | 12/2005 | Struyk |
| 7,474,862 | B2 | * | 1/2009 | Shouno ............................ 399/80 |
| 7,620,610 | B2 | * | 11/2009 | Macbeth et al. ................. 706/14 |
| 7,716,308 | B2 | * | 5/2010 | Matsubara ..................... 709/219 |
| 7,870,614 | B1 | * | 1/2011 | Duhaime et al. ................. 726/28 |
| 7,904,953 | B2 | * | 3/2011 | Meyer et al. ..................... 726/12 |
| 8,205,240 | B2 | * | 6/2012 | Ansari et al. ....................... 726/1 |
| 8,228,563 | B2 | * | 7/2012 | Walton .......................... 358/3.28 |
| 2001/0011247 | A1 | * | 8/2001 | O'Flaherty et al. ............. 705/39 |
| 2001/0024200 | A1 | * | 9/2001 | Gupta et al. ................... 345/418 |
| 2002/0093514 | A1 | * | 7/2002 | Edwards et al. .............. 345/626 |
| 2002/0095405 | A1 | * | 7/2002 | Fujiwara ........................... 707/3 |
| 2002/0188187 | A1 | | 12/2002 | Jordan |
| 2003/0014394 | A1 | * | 1/2003 | Fujiwara et al. .................. 707/3 |
| 2003/0026479 | A1 | * | 2/2003 | Thomas et al. ................ 382/173 |
| 2003/0103189 | A1 | * | 6/2003 | Neureuther et al. .......... 351/176 |
| 2003/0191744 | A1 | * | 10/2003 | Derr et al. ......................... 707/1 |
| 2004/0100477 | A1 | * | 5/2004 | Morita et al. .................. 345/626 |
| 2005/0162668 | A1 | * | 7/2005 | Noda ............................. 358/1.1 |
| 2005/0204329 | A1 | * | 9/2005 | Pauca et al. ..................... 716/21 |
| 2005/0221857 | A1 | * | 10/2005 | Miyashita et al. ............. 455/557 |
| 2005/0254086 | A1 | * | 11/2005 | Shouno ........................ 358/1.15 |
| 2005/0264839 | A1 | * | 12/2005 | Nemoto ....................... 358/1.13 |
| 2006/0074897 | A1 | | 4/2006 | Fergusson |
| 2006/0129823 | A1 | * | 6/2006 | McCarthy et al. ............ 713/176 |

(Continued)

FOREIGN PATENT DOCUMENTS

| WO | 9948238 A1 | 9/1999 |
| WO | 2004061610 A2 | 7/2004 |

*Primary Examiner* — Daeho Song

(74) *Attorney, Agent, or Firm* — Janaki K. Davda; Konrad Raynes Dadvda & Victor LLP

(57) ABSTRACT

Provided are techniques for integrated masking for viewing of data. A record is encoded with a mask definition, wherein the mask definition describes which one or more portions of the record are to be hidden. A request to display the encoded record is received. The encoded record is displayed with the one or more portions of the record hidden based on the mask definition.

18 Claims, 5 Drawing Sheets

(56) References Cited

U.S. PATENT DOCUMENTS

| | | | |
|---|---|---|---|
| 2006/0129967 A1* | 6/2006 | Tanaka et al. | 716/19 |
| 2006/0140508 A1* | 6/2006 | Ohgishi et al. | 382/284 |
| 2007/0067680 A1* | 3/2007 | Harada et al. | 714/45 |
| 2007/0156691 A1* | 7/2007 | Sturms et al. | 707/9 |
| 2007/0253620 A1* | 11/2007 | Nagarajan et al. | 382/164 |
| 2007/0294375 A1* | 12/2007 | Matsubara | 709/219 |
| 2007/0299881 A1* | 12/2007 | Bouganim | 707/200 |
| 2008/0050037 A1* | 2/2008 | Sakiyama et al. | 382/283 |
| 2009/0007011 A1* | 1/2009 | Czerwinski et al. | 715/810 |
| 2009/0048997 A1* | 2/2009 | Manickam et al. | 706/47 |

* cited by examiner

INTEGRATED MASKING FOR VIEWING OF DATA

FIELD

Embodiments of the invention relate to integrated masking for viewing of data.

SUMMARY OF EMBODIMENTS OF THE INVENTION

Provided are a method, computer program product, and system for integrated masking for on-line view of data. A record is encoded with a mask definition, wherein the mask definition describes which one or more portions of the record are to be hidden. A request to display the encoded record is received. The encoded record is displayed with the one or more portions of the record hidden based on the mask definition.

BRIEF DESCRIPTION OF THE DRAWINGS

Referring now to the drawings in which like reference numbers represent corresponding parts throughout.

DETAILED DESCRIPTION

Figure 1:
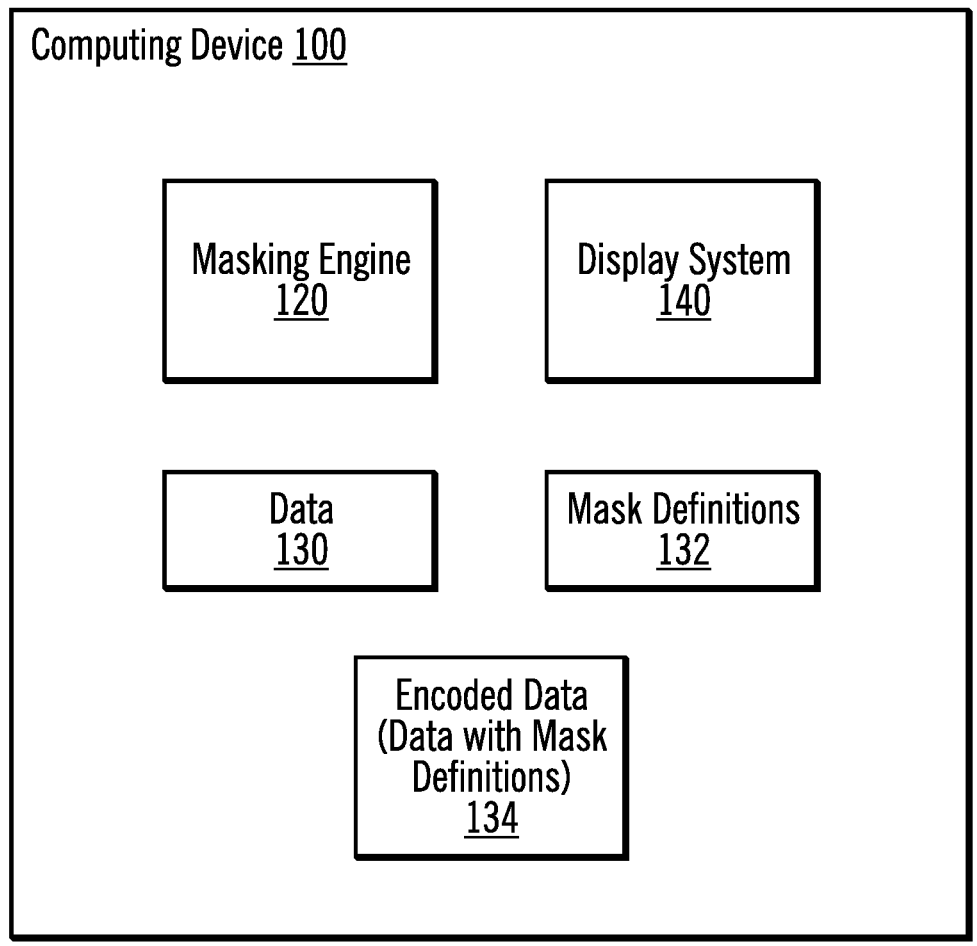
FIG. 1 illustrates details of a computing device in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

Customers often have a need to present data electronically. This is often in the form of looking at transactional data on-line and applies daily to customer support (also known as "CRM") and to customer printing and mailing applications. Presentation capability can be integrated within an Infoprint Process Director ("IPPD") product. Most customers do not have enough visual presentation capability in their current print and mailing operations, and IPPD's ability to display final-form presentation in an integrated workflow and print environment adds to the customer's ability to meet the needs for display of transactional data. A Content Manager OnDemand ("CMOD") product (available from IBM Corporation) provides historical customer record access to millions of transactions, via help-desk and Customer Relationship Management (CRM) inquiries.

A problem is that, by it's very nature, many transactions that are presented to customers may contain highly sensitive data, such as Social Security Numbers (SSNs), account numbers, value of accounts, and billing addresses. In medical contexts, statements must meet Health Insurance Portability and Accountability Act (HIPAA) requirements and may contain sensitive information about medical procedures performed. In government taxation and other contexts, Social Security and tax-bill information are an essential part of every transaction. In other government contexts, transactional data may contain sensitive or secret information. In insurance and banking contexts, transactions may constitute paycheck or other checking data or may include very valuable information, such as a new visa credit card number and a corresponding PIN code. In all of these cases, and many others, there is a tradeoff with presenting information electronically. On the one hand, there have to be controls put into place to limit who can access the transactional records, and, on the other hand, there is a desire is to limit which portions of the transactional record are to be displayed.

It has long been true that these sensitive transactions are displayed in the print-room. However, in this context the data is controlled, and the automated print production gives very little exposure of sensitive customer data. This is primarily because it is automatic and very high-speed (all the way through-and-including the enveloping process), and, for the most part, the data progresses from paper to sealed envelope with limited human exposure to selected records along the way. This means that it is extremely difficult to capture sensitive information from a print and mail facility, without removing physical print samples, which is relatively easy to prevent via procedures, training, and camera monitoring. By contrast, the ability to view data on a computer display screen (e.g., a monitor), and especially the ability to view every single page of a print file electronically, increases exposure to identity theft because electronically exposed data may be captured in a variety of manners (e.g., screen capture, e-mail, etc.), and this increases the exposure of individuals to identity theft, while increasing potential customer liability. Thus, the root problem is that even as the industry is still trying to increase ability to view transactional data on-line, there is an acute and growing need to LIMIT what is actually displayed on-line when some people access the transaction, and who can see the transactions at all.

Only limited solutions to this problem are in place today. Some customers have taken to including only a minimum amount of information in statements (such as only the last 4 digits of the SSN) whenever possible. However, while a good policy, this does not solve the root problem, and, in many important contexts, sensitive information remains in the transactional record by necessity. A primitive approach has been observed whereby a subsequent "mask" is applied atop the data (either electronically or physically) to blot out sensitive data (e.g., by placing a dark rectangle over the sensitive data or by placing X's over the sensitive data). However, such masks are not flexible, and when the data placement changes for any reason (application change, merger, etc.), the masks must be carefully reset or the exposure of the data will once-again occur.

Embodiments provide integrated masking for viewing of data either on-line or off-line. An on-line view of data may be described as display of data on a display screen (e.g., a computer display screen, a PDA display screen, a cell phone display screen, etc.). An off-line view of data may be described as data in physical form (e.g., paper, microfiche, etc.).

FIG. 1 illustrates details of a computing device 100 in accordance with certain embodiments. The computing device includes a masking engine 120, data 130, mask definition 132, encoded data 134, and a display system 140. Data 130 is any type of data (e.g., transaction data, mail pieces, booklets, etc.). The mask definition 132 provides an indication of which portions of the data 130 are to be masked and how (e.g., mask first five digits of social security number (regardless of where social security number is displayed relative to other data) or mask rectangular region of a certain portion of a page of data). The masking engine 120 encodes the mask definition 132 with the data 130 to form encoded data 134. In certain embodiments, encoding the mask definition 132 with the data 130 comprises storing the mask definition 132 with the data 130. Various forms of encoding may be used with different embodiments. The masking engine 120 is able to mask portions of the data 130 based on the mask definition 132 for display. The display system may be, for example, a browser that displays data to a customer service representative or a printer that prints data to paper.

The computing device 100 may comprise any computing device known in the art, such as a server, mainframe, workstation, personal computer, hand held computer, laptop telephony device, network appliance, etc.

Embodiments record which portions of data 130 (e.g., a transactional record) are appropriate for on-line or off-line display, and stores this information within the data itself as a mask definition 132. For example, embodiments may record that only the last 4 digits of the Social Security Number (SSN) should be displayed. Then, when real-time production or subsequent record look-up displays the data 130 electronically, a digital mask is imposed into the data 130 to match the appropriate on-line or off-line display criteria. This results in a visual on-line or off-line display that shows the appropriate portions of the data 130, while "blacking out" ("masking") portions of the data 130 on the computer display screen to preserve sensitivity. Embodiments also apply to many other reprint and display scenarios.

Figure 2:
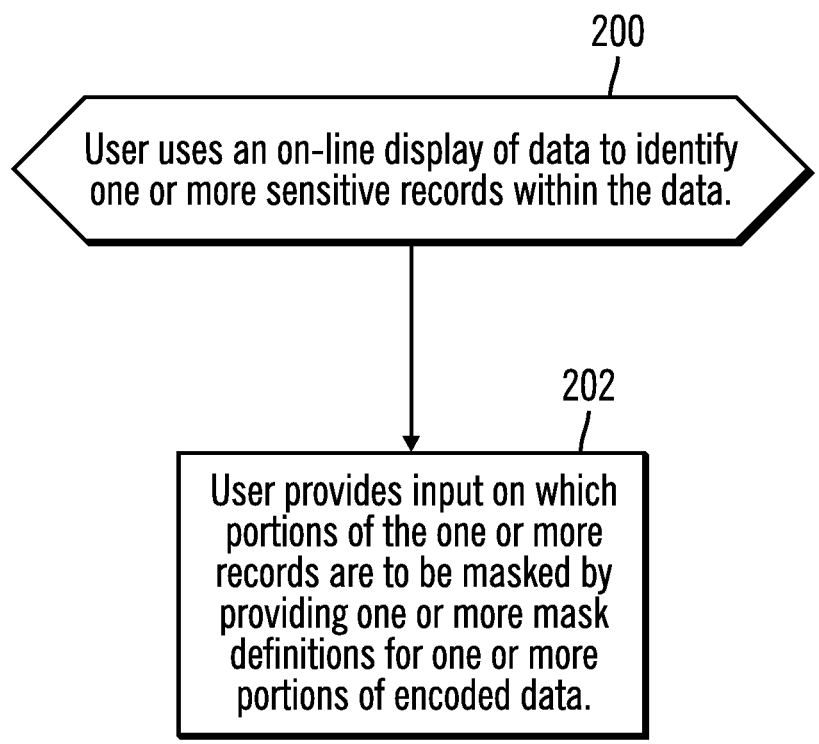
FIG. 2 is a flow diagram illustrating receipt of user input in accordance with certain embodiments.

FIG. 2 is a flow diagram illustrating receipt of user input in accordance with certain embodiments. Control begins in block 200 with a user (e.g., a customer) using an on-line display of the data 130 to identify one or more sensitive records (e.g., an account number or a home address) within the data 130 (e.g., a bank statement needed for client support). In certain embodiments, the user identifies the sensitive records using an indexing product (e.g., accessing bank statements via account numbers that were automatically indexed). The Visual Indexer product is one example of such an indexing product.

In block 202, a user provides input on which portions of the one or more sensitive records are to be masked (i.e., hidden or not displayed) by providing one or more mask definitions 132 for one or more portions of the encoded data. For example, embodiments enable encoding most of a SSN (e.g., XXX-XX-4321) with one mask, but, embodiments also allow a multiplicity of masks of various portions of the encoded data (e.g., encoding different portions of a SSN with different masks (e.g., XXX-42-YYYY, where X and Y are separate masks). In particular, for each sensitive record identified, a secondary identification is possible, whereby the user identifies one or more portions of the sensitive record that should be displayed, where different portions of data may be displayed on-line and off-line. In certain alternative embodiments, the user identifies one or more portions of the sensitive record that should not be displayed, where different portions of data may be displayed on-line and off-line. A "mask" may be described as a portion of the sensitive record that is not to be displayed (e.g., in an on-line context, when the data is reprinted from an archive, etc.).

Figure 3:
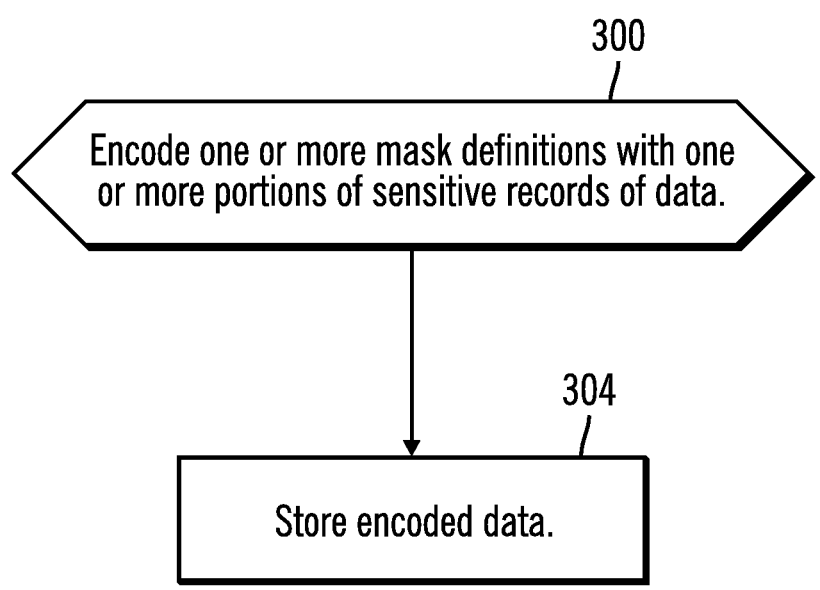
FIG. 3 is a flow diagram illustrating processing performed by a masking engine in accordance with certain embodiments.

FIG. 3 is a flow diagram illustrating processing performed by the masking engine 120 in accordance with certain embodiments. Control begins at block 300 with the masking engine 120, for each mask, encoding the one or more mask definitions 132 with the one or more portions of the sensitive records of the data 130 itself (i.e., by inserting the mask definitions within the data stream) to form encoded data. In block 302, the masking engine 120 stores the encoded data 134.

In certain embodiments, the encoding is within Mixed Object—Document Capture Architecture—Presentation (MO:DCA-P) (also known as Advanced Function Print (AFP) data, using one Tagged Logical Element (TLE) record for each mask. In these embodiments, the mask definition 132 identifies the Cartesian coordinates (e.g., two points specifying a rectangle) for a digital mask, which can then be applied when the data 130 is to be displayed.

Figure 4:
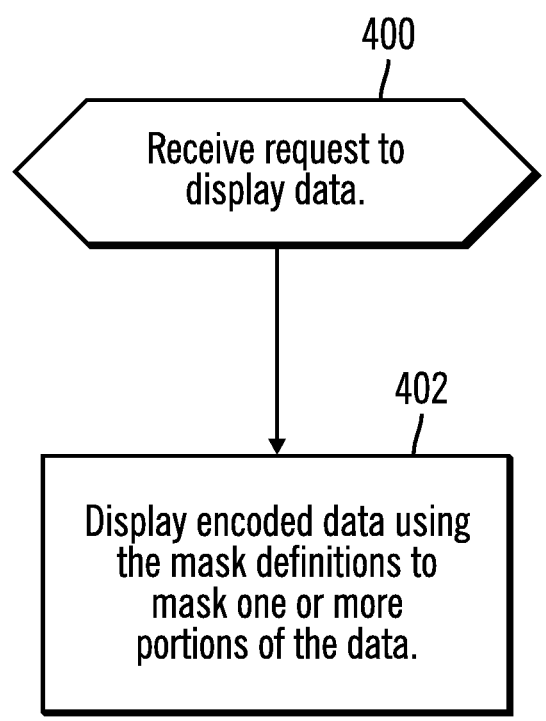
FIG. 4 is a flow diagram illustrating masking in accordance with certain embodiments.

FIG. 4 is a flow diagram illustrating masking in accordance with certain embodiments. Control begins at block 400 with the masking engine 120 receiving a request to display encoded data 134 (e.g., on a computer display screen or by printing to paper). In block 402, the masking engine 120 displays the encoded data 134 using the mask definition 132 to mask one or more portions of the encoded data 134.

Thus, with embodiments, each mask definition 132 effectively creates "optional black areas" within the data 130 itself. However, when displayed in any context (e.g., on-line (e.g., with IPPD or CMOD products) or by printing), the masks are treated as integral portions of the data 130, and the display on the screen, including any screen capture or print screen, shows the "blacked out" rectangles in lieu of the sensitive data.

In certain embodiments, when the data 130 is printed and mailed, the mask definitions 132 are ignored, resulting in a secured envelope for the customer, which contains all of the information.

Embodiments allow for many variants of this technology, including a variety of "flavors" of mask for differing downstream applications. One flavor may be printing data and mailing the data, and another flavor may be a customer service representative viewing the data on a computer display screen. Therefore, data may have multiple masks for different roles or purposes.

With embodiments, multiple records or portions in a set of data can each be encoded with one or more mask definitions. For example, on a bank statement, an account number may be encoded with one or more mask definitions and a total account value may be encoded with one or more mask definitions. The mask definitions may be the same or different for the different records or portions.

Certain embodiments "reverse the default", and, instead of treating the mask as one used during display, the mask is treated as a real blacked out area within the data, which may be removed within the proper contexts where it needs to be removed. With these embodiments, the mask may be described as an "indelible mask" and removal of the mask would require, for example, a special code, licensing certain technology, etc.

Embodiments have applications outside of AFP, in any valid transactional data stream or other presentation context. Further, embodiments provide for selectively enforcing the mask based on userid (e.g., allowing an administrator to see an entire sensitive record, while allowing an operator to see the sensitive record only after that record has been masked). Embodiments enable creation of masks in-advance for particular datatypes, real-time during production operations as a process in the production workflow, and post-processing for existing data in an archives Thus, embodiments are applicable to any industry with sensitive data that desires to selectively mask portions of the data. For example, this is applicable to out-sourcing and off-shoring operations in which masked data would enable out-sourcing and off-shoring of phone support and other operations while minimizing the sensitive customer data that is exposed.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, and 4 may be implemented in software, hardware, programmable and non-programmable gate array logic or in some combination of hardware, software, or gate array logic.

Figure 5:
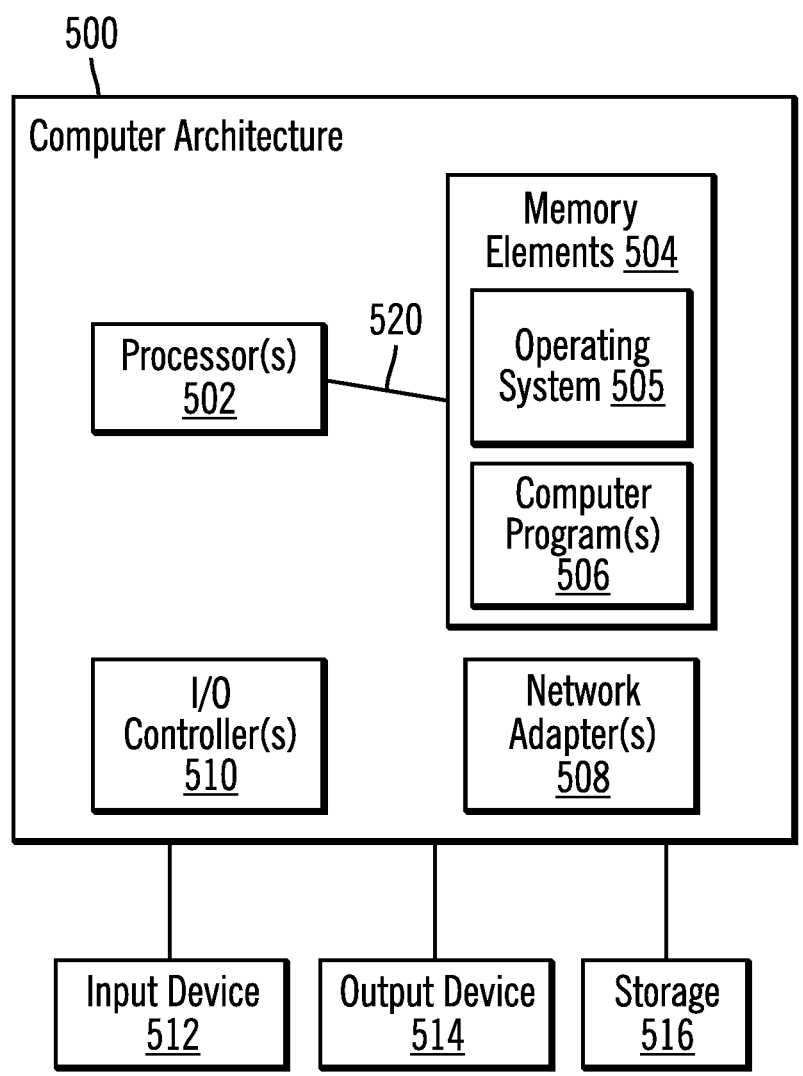
FIG. 5 illustrates a system architecture that may be used in accordance with certain embodiments.

FIG. 5 illustrates a system architecture 500 that may be used in accordance with certain embodiments. Computing device 100 may implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, computer display screens, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
    storing, using a processor of a computer, records in a storage device;
    receiving, using the processor of the computer, user selection that identifies a first record of the records as containing sensitive information;
    receiving, using the processor of the computer, user input providing a first set of mask definitions for the first record, wherein different portions of the first record are masked based on whether the first record is provided as one of an on-line view on a display screen and an off-line view in printed form;
    storing, using the processor of the computer, the first set of mask definitions with the first record in the storage device;
    encoding, using the processor of the computer, each of the different portions of the first record with a mask definition from the first set of mask definitions, wherein the different portions of the first record are displayed on-line on the display screen and printed off-line;
    storing, using the processor of the computer, the encoded record in the storage device;
    displaying, using the processor of the computer, the encoded record on-line on the display screen;
    receiving, using the processor of the computer, a code; and
    in response to receiving the code, removing, using the processor of the computer, the first set of mask definitions.

2. The computer-implemented method of claim 1, further comprising:
    receiving a request to print the encoded record; and
    printing the encoded record on paper.

3. The computer-implemented method of claim 1, further comprising:
    displaying the encoded record on a display screen.

4. The computer-implemented method of claim 1, further comprising:
    printing the encoded record off-line.

5. The computer-implemented method of claim 1, further comprising:
    encoding the first record with another set of mask definitions for different roles.

6. The computer-implemented method of claim 1, further comprising:
    receiving user selection that identifies a second record of the records as containing sensitive information;
    receiving user input providing a second set of mask definitions for the second record;
    storing the second set of mask definitions with the second record in the storage device; and
    encoding each different portion of the second record with a mask definition from the second set of mask definitions.

7. A computer program product comprising a non-transitory computer-readable medium storing a computer readable program, wherein the computer readable program when executed by a processor on a computer causes the computer to:
    store records in a storage device;
    receive user selection that identifies a first record of the records as containing sensitive information;
    receive user input providing a first set of mask definitions for the first record, wherein different portions of the first record are masked based on whether the first record is provided as one of an on-line view on a display screen and an off-line view in printed form;
    store the first set of mask definitions with the first record in the storage device;
    encode each of the different portions of the first record with a mask definition from the first set of mask definitions, wherein the different portions of the first record are displayed on-line on the display screen and printed off-line;
    store the encoded record in the storage device;
    display the encoded record on-line on the display screen;
    receive a code; and
    in response to receiving the code, remove the first set of mask definitions.

8. The computer program product of claim 7, wherein the computer readable program when executed by the processor on the computer causes the computer to:
    receive a request to print the encoded record; and
    print the encoded record on paper.

9. The computer program product of claim 7, wherein the computer readable program when executed by the processor on the computer causes the computer to:
    display the encoded record on a display screen.

10. The computer program product of claim 7, wherein the computer readable program when executed by the processor on the computer causes the computer to:
    print the encoded record off-line.

11. The computer program product of claim 7, wherein the computer readable program when executed by the processor on the computer causes the computer to:
    encode the first record with another set of mask definitions for different roles.

12. The computer program product of claim 7, wherein the computer readable program when executed by the processor on the computer causes the computer to:
    receive user selection that identifies a second record of the records as containing sensitive information;
    receive user input providing a second set of mask definitions for the second record;
    store the second set of mask definitions with the second record in the storage device; and
    encode each different portion of the second record with a mask definition from the second set of mask definitions.

13. A system, comprising:
    a processor; and
    a storage device coupled to the processor and storing program code, wherein the processor executes the program code to perform operations, the operations comprising:
        storing records in a storage device;
        receiving user selection that identifies a first record of the records as containing sensitive information;
        receiving user input providing a first set of mask definitions for the first record, wherein different portions of the first record are masked based on whether the first record is provided as one of an on-line view on a display screen and an off-line view in printed form;
        storing the first set of mask definitions with the first record in the storage device;

encoding each of the different portions of the first record with a mask definition from the first set of mask definitions, wherein the different portions of the first record are displayed on-line on the display screen and printed off-line;

storing the encoded record in the storage device;

displaying the encoded record on-line on the display screen;

receiving a code; and in response to receiving code, removing the first set of mask definitions.

14. The system of claim 13, wherein the operations further comprise:

receiving a request to print the encoded record; and printing the encoded record on paper.

15. The system of claim 13, wherein the operations further comprise:

displaying the encoded record on a display screen.

16. The system of claim 13, wherein the operations further comprise:

encoding the first record with another set of mask definitions for different roles.

17. The system of claim 13, wherein the operations further comprise:

printing the encoded record off-line.

18. The system of claim 13, wherein the operations further comprise:

receiving user selection that identifies a second record of the records as containing sensitive information;

receiving user input providing a second set of mask definitions for the second record;

storing the second set of mask definitions with the second record in the storage device; and encoding each different portion of the second record with a mask definition from the second set of mask definitions.

* * * * *